United States Patent [19]

Bossert

[11] Patent Number: 5,304,302
[45] Date of Patent: Apr. 19, 1994

[54] APPARATUS FOR TREATING A LIQUID WITH ALTERNATING MAGNETIC AND ELECTRIC FIELDS

[75] Inventor: Karl Bossert, Villingen, Fed. Rep. of Germany

[73] Assignee: Gerdi Bossert, Villingen, Fed. Rep. of Germany

[21] Appl. No.: 641,503

[22] Filed: Jan. 15, 1991

[30] Foreign Application Priority Data

Apr. 6, 1990 [DE] Fed. Rep. of Germany ....... 9004033
Aug. 10, 1990 [DE] Fed. Rep. of Germany ....... 9011686
Oct. 19, 1990 [EP] European Pat. Off. ........... 90120134

[51] Int. Cl.$^5$ .............................................. C02F 1/48
[52] U.S. Cl. .................................. 210/222; 210/243; 210/695; 210/748
[58] Field of Search ............... 210/222, 223, 243, 695, 210/748, 206, 259, 295; 204/302

[56] References Cited

U.S. PATENT DOCUMENTS 3,349,354 10/1967 Miyata ................................. 210/222
4,879,045 11/1989 Eggerichs ............................ 210/695
4,883,591 11/1989 Belasco ................................ 210/223

FOREIGN PATENT DOCUMENTS 548303 11/1959 Belgium ............................... 210/748
0333892 9/1989 European Pat. Off. .
3618174 12/1987 Fed. Rep. of Germany ...... 210/223
8816213 6/1989 Fed. Rep. of Germany .
8904085 7/1989 Fed. Rep. of Germany .
8912482 1/1990 Fed. Rep. of Germany .
1268889 10/1989 Japan .................................. 210/748
8302997 3/1984 Netherlands ........................ 210/243

OTHER PUBLICATIONS

Patent Abstracts of Japan, vol. 4, No. 026, Mar. 6, 1980, JP-A-55000720.

*Primary Examiner*—Matthew O. Savage
*Attorney, Agent, or Firm*—Anderson Kill Olick & Oshinsky

[57] ABSTRACT

For treating liquids, particularly in order to reduce the furring properties of water, there are disposed in the flow path of the liquid a sequence comprising a unit (101) exposing the liquid to a magnetic field and after it in the direction of flow a unit (103) which exposes the liquid to an electrical field, particularly a pulsed alternating field.

10 Claims, 4 Drawing Sheets

APPARATUS FOR TREATING A LIQUID WITH ALTERNATING MAGNETIC AND ELECTRIC FIELDS

The invention relates to an apparatus for the treatment of liquids, particularly water, wherein the flow path of the liquids, a plurality of treatment units are disposed successively in the direction of flow.

At the entrance of a, for instance, water-conveying pipeline system, of a building, it is known to fit a filter which traps dirt particles and the like. It is furthermore known to have the filter followed by a magnetic device which exposes the water flowing through the throughflow space of the magnetic unit to a magnetic direct or alternating current field. The magnetic unit reduces possible calcification of the pipeline system. Finally, it is known to reduce calcification of the pipeline system through which the water flows, in that at the entrance to the pipeline system a device is provided which exposes the water to an electrical direct current field. It has, however, been demonstrated that such devices which expose the water to an electrical direct current field have a comparatively high power requirement and thus produce an electrolytical decomposition of the water, or they require high voltages. Therefore, units of this type are in some cases controlled by throughflow sensors and are switched on only when water is being withdrawn.

From a first point of view, it is an object of the invention to show a way how it is possible, with comparatively minimum power consumption, to reduce to a considerable degree, crusting phenomena in liquid-conveying systems, particularly calcification in water-conducting systems.

According to the invention, this problem is resolved in that in the flow path of the liquid there is a first unit which exposes the liquid to a magnetic field while in the flow path, particularly behind but possibly also in front, there is a second unit which exposes the liquid to an electrical field. Surprisingly, it has been found that liquids, particularly water, which are exposed to a magnetic field and additionally to an electrical field, have advantageously improved properties. Furring, such as for example furring in the liquid conveying system is reduced. For example, if drinking water has an increased nitrate content, this is reduced in the process. These advantages are available particularly when the liquid is exposed to the magnetic field before it passes through the electrical field in order to reduce furring. Surprisingly, it has been found that the water increases its specific impedance, with the result that the current flowing in the electrical field is reduced. Although the risk of furring can likewise be reduced by a sufficiently high magnetic field alone, the combination of a unit exposing the liquid to the magnetic field with a unit which subsequently exposes the liquid to an electrical field is able to reduce furring already by weaker magnetic fields. While the generation of strong magnetic fields normally requires an electromagnet, in combination with a unit which exposes the liquid to an electrical field, also permanent magnets can be used for generating a magnetic field.

In the case of conventional apparatus for treating liquids, the units employed for the purpose are usually constructed as components which are separate from one another, being connected to one another by portions of tubing. This kind of arrangement entails a comparatively high cost of installation and occupies comparatively considerable space.

From a second point of view, therefore, it is an object of the invention to reduce furring in liquid conveying systems, particularly furring in water conveying systems, so that the cost of installation and the space requirement of the apparatus used for the purpose can be relatively small.

In order to resolve this aspect of the problem, the invention utilizes an apparatus such as is described in German Utility Model No. 88 16 213. According to this, the units have separate throughflow housings, each of which has an inlet aperture and a discharge orifice which are disposed beside each other in the throughflow housings and are accessible from the said side, the throughflow housings being separably mounted on a common supporting plate having feed and discharge apertures facing the supporting plate which contains between an input connection and an output connection, a plurality of connecting passages which on the side which is towards the throughflow housings have passage mouths orientated alternately to the feed aperture, and to the discharge orifice of the individual throughflow housings. From the aforesaid second aspect of the invention, at least a first of the devices disposed on the common supporting plate is a device which exposes the liquid to a magnetic field while downstream of this first device there is at least one second device which exposes the liquid to an electrical field, and/or at least a third device which is constructed as a filter being disposed in the flow path of the liquid. An apparatus of this type constitutes one structural unit which can be operated in itself, occupies comparatively little space and can be easily assembled.

The supporting plate is expediently provided with more than two throughflow housing receiving positions so that the number of throughflow housings which can be connected to the supporting plate may be freely chosen according to the requirements in any particular case. Thus, it is possible to dispose on the supporting plate a plurality of liquid-cleansing filters one after another and/or a plurality of units which expose the liquid to a magnetic field, these being disposed in separate throughflow housings. Unoccupied connection positions on the supporting plate can be bridged by covers which are separably fixed on the supporting plate, in so far as these covers together with the supporting plate form a throughflow chamber between immediately adjacent connecting passages.

The supporting plate may also accommodate additional units or arrangements and connect them to the flow path. An expedient further development envisages disposing in the flow path downstream of the filter and preferably also downstream of the unit which exposes the liquid to a magnetic field a unit which exposes the liquid to an electrical field, of the electrodes of which, connected to a voltage source, at least one is disposed in a throughflow flow housing which is separate from the throughflow housings of the filter and of the magnetic unit, which overlaps with the passage mouths of connecting passages on the supporting plate being separably connected to this latter. Such an electrode arrangement may be an installation for cathodic corrosion protection, in which the electrode disposed in the throughflow housing constitutes an anode, while the pipeline system is used as a cathode. However, it is also possible for both electrodes to be disposed on beside the other in the throughflow housing since it has been found, particularly when using a relatively low frequency pulse source, the biological properties of the liquid can be improved.

Since the unit which exposes the liquid to the electrical field expediently comprises a tubular housing receptacle which has a feed aperture at one end while being closed at the other, and has projecting substantially equi-axially into the housing and forming together therewith an electrode tube which forms an annular throughflow space which, adjacent the feed aperture, forms a discharge orifice and which is axially open towards the housing. The electrode tube forms one of the tow electrodes. The other electrode may be constituted by an electrode rod disposed coaxially in the electrode tube. The last-mentioned embodiment is particularly advantageous if the housing likewise consists of metal and is connected in electrically conductive fashion to the electrode rod. In this way, the path over which the liquid is exposed to the electrical field can be extended despite the small dimensions of the unit.

The unit which exposes the liquid to a magnetic field may be of known construction and may comprise at least one but preferably a plurality of permanent magnets or one electromagnet. In a preferred development which, like the above-described unit which exposes the liquid to an electrical field, is of significance in both aspects of the invention, the magnetic unit comprises a tubular housing which is closed at one end while having at the other an inlet aperture, a labyrinthine tube which protrudes substantially equi-axially into the housing with which it forms a first throughflow chamber and which, adjacent the supply aperture, forms a discharge orifice being open axially opposite the housing, as well as a plurality of permanent magnets disposed within the labyrinthine tube in its axial direction in a row and with alternating polarity. These form between themselves and the labyrinthine tube a second annular throughflow space. Such a unit can be produced at comparatively low structural cost and exposes the liquid to the magnetic field over a comparatively long path. Expediently, the permanent magnets are disposed in a protective tube extending substantially equi-axially with the labyrinthine tube so that the second annular throughflow space extends between the protective tube and the labyrinthine tube. The protective tube seals the magnets in relation to the liquid.

In an alternative embodiment, both the unit which exposes the unit to the magnetic field and also the unit which exposes the liquid to the electrical field have one tubular housing with in each case an inlet aperture and an outlet orifice in the region of the oppositely disposed ends. A particularly simple development which consists of a few housing components which are the same for both units, is possible if the two tubular housings are disposed axially parallel with and beside each other, each having a discharge orifice and an inlet aperture by which they are connected to form one unit. In the tubular housing of the unit which exposes the liquid to the magnetic field, it is possible to dispose a plurality of permanent magnets disposed one beside another in an axial direction of the tubular housing in one row and in particular with alternating polarity. The inlet apertures or outlet orifices are preferably provided in caps which are screwed onto the tubular housings. The caps of the inter-connected inlet and outlet apertures expediently form one structural unit. The other caps are individually rotatable in relation to the tubular housing and are preferably secured by a lock nut so that the angular position of the inlet aperture and outlet orifice in respect of each other may be rotated according to the installation situation.

Where the liquid cleansing filter is concerned, this may be a conventional dirt particle filter in which case it is expedient to dispose at least one permanent magnet in the throughflow housing of the filter to trap particles of iron and the like. Such a filter is expediently disposed downstream of the magnetic unit.

In a preferred development of both the first and also of the second aspect of the invention, there is downstream of the first unit, i.e. the magnetic unit, a third unit which is constructed as a filer and which cleanses the fluid from particles contained therein. Such a filter traps the calcification which is structurally altered by the magnetic unit and makes it possible for example in the case of water-carrying systems, to adjust the degree of hardness of the water. Where the magnetic unit is connected in series with a second unit which exposes the liquid to an electrical field, the filter is preferably disposed downstream of the serial connection.

It has been found that the effect of the electrical field on the liquid to be treated is particularly great if there is connected to the electrode arrangement of the unit an electrical pulse generator which generates periodic voltage pulses. The pulse sequence frequency is preferably greater than 1 KHz and particularly greater than 10 KHz. In this way, it is possible not only to achieve furring-reducing results but also additional results such as for example growth promotion of plants which are given water which has been thus treated. Where the voltage pulses are concerned, these are particularly alternating current pulses, in order to minimize electrolysis phenomena in the liquid which is exposed to the electrical field.

It has been found that the effect of the electrical field varies as a function of the pulse frequency. In a preferred development, therefore, a plurality of the aforementioned units for exposing the liquid to an electrical field are disposed one after another in the direction of flow, the pulse generators of these units each having mutually differing pulse frequencies. Between the individual units which expose the liquid to the electrical field it is possible to provide further magnetic units.

In hard water areas, where the water contains lime, apparatuses of the above-described type can reduce lime deposits in the subsequent pipeline systems. It has been found that the hardness of the water can be increased from soft, i.e. low-lime water, and the corrosive damage connected with soft water can be avoided if a container is connected to the output from the apparatus and, in the flow path of the water, contains lime material in bulk form. By reason of the line-dissolved properties of the water, which are improved especially by the magnetic unit, the water hardness can be raised to corrosion-reducing levels.

Figure 1:
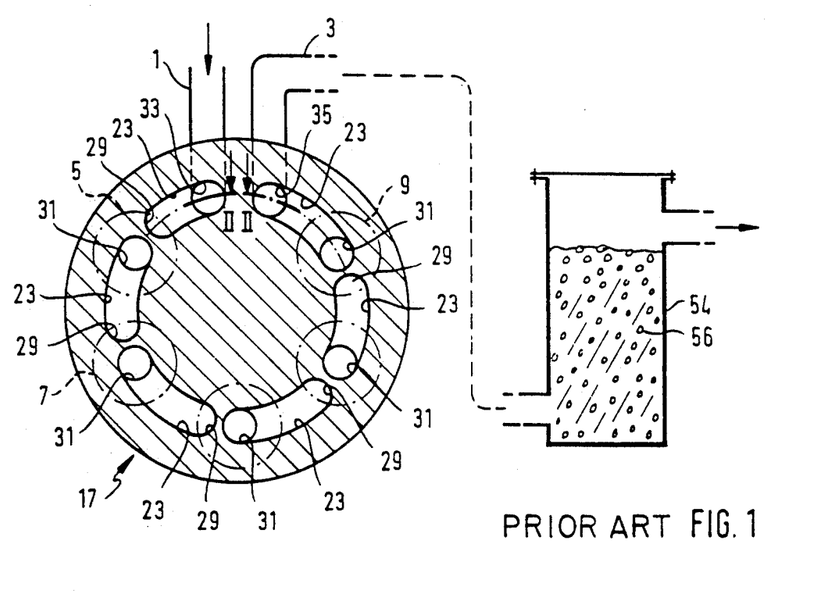
FIG. 1 is a diagrammatic sectional view through a prior art water treatment apparatus viewed on the line I—I in FIG. 2.
Figure 2:
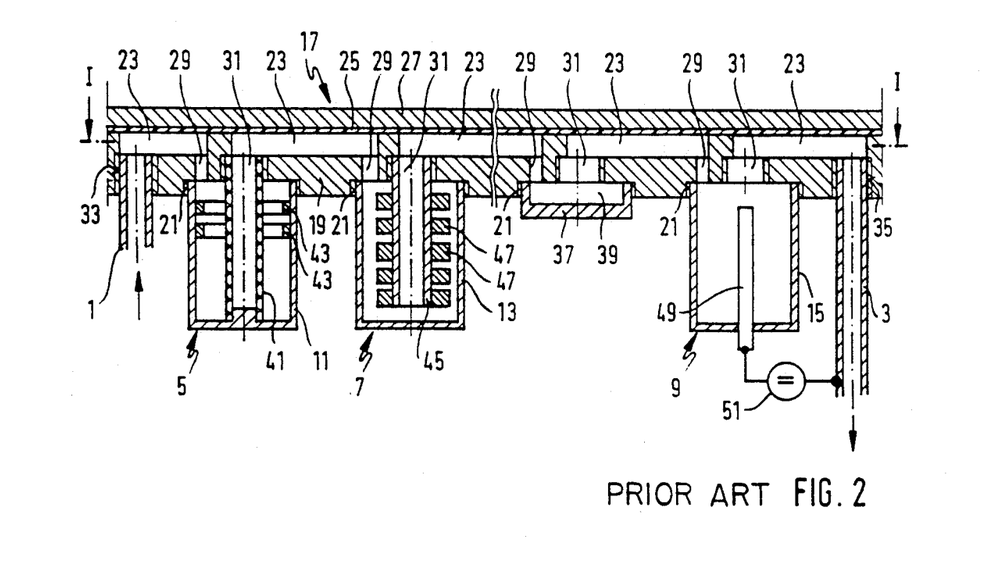
FIG. 2 shows a developed section through the apparatus viewed along a line II—II in FIG. 1.

The invention will be explained in greater detail hereinafter with reference to accompanying drawings, in which:

FIGS. 1 and 2 illustrate a prior art water treatment apparatus disclosed in German Patent G 89 12 482.0.

In the flow path of the water which is supplied via a feed path 1, and which flows out through a discharge pipe 3, the water treatment apparatus comprises filters 5 which cleanse the water of dirt particles, a magnetic unit 7 which exposes the water to a magnetic field and a unit 9 for cathodic corrosion reduction, in this case for reducing corrosion particularly in the discharge pipe 3. The unit 9 exposes the water to an electrical field, in this case a direct current voltage field. The filter 5, the magnetic unit 7 and the unit 9 have separate throughflow housings 11, 13 and 15 and are separably mounted on a substantially circular and common supporting plate 17. The supporting plate 17 has for this purpose a base plate 19 which, on its side facing the throughflow housings 11, 13, 15, has, disposed in a circular series, identically formed screwthreaded connections 21 into which the otherwise cap-like throughflow housings 11, 13, 15 are screwed in a sealing-tight fashion. On the side remote from the screwthreaded connectors 21, the base plate 19 is provided with connecting passages 23 in the form of grooves shaped like segments of a circle and which are outwardly covered in sealing-tight manner by a gasket 25 and a cover plate 27. The adjacent ends of the connecting passages 23 which are in each case consecutive in the direction of flow are connected to the opposite side of the base plate 19 via throughflow apertures 29, 31 disposed within each of the screwthreaded connections 21. In this respect, the throughflow aperture 29 is seated eccentrically of the axis of the screwthreaded connection 21, while the throughflow aperture 31 is disposed centrically in respect of this axis. The feed pipe 1 and discharge pipe 3 are connected by connecting apertures 33, 35 to the relevant terminal connecting passages 23. The flow path of the water between the connecting passages is completed via the throughflow housings 11, 13, 15. Since the base plate comprises more screwthreaded connections 21 than there are screwed-in throughflow housings, excess screwthreaded connections 21 are closed by covers 37 which form between themselves and the base plate 19 a throughflow chamber 39. The water treatment apparatus can therefore, as required, be equipped with additional filters or additional units which expose the water to a magnetic or electrical field.

The filter 5 is of conventional construction and contains in its substantially cylindrical throughflow housing 11 which is open on the side of the base plate 19 a central filter cartridge 41 which is sealed in respect of the throughflow aperture 31 and possibly strengthened by a bracing member. In the throughflow housing 11, in addition, there are in the example of embodiment annular permanent magnets 43 which trap iron particles.

The likewise substantially cylindrical throughflow housing 13, open towards the base plate 19, and associated with the magnetic unit 7, encloses a pipe 45 of non-magnetic material which is held in the throughflow aperture 31 and which opens out inside the throughflow housing 13 and carries a plurality of annular permanent magnets 47. The throughflow housing 13 likewise consists of non-magnetic material. The water entering the throughflow housing 13 through the aperture 29 flows through the magnetic field in the outer zone of the annular magnets 47 and then through the pipe 45 through the magnetic field in the inner region of the magnets. Instead of the magnetic unit 7 described, it is also possible to use other structures, particularly based on electromagnets.

The unit 9 which exposes the water to an electrical field comprises a pot-shaped cylindrical throughflow housing 15 of insulating material into which protrudes an anode electrode 49 of magnesium for example. The anode electrode 49 is connected to a direct current voltage source 51 which is at the same time also connected to the discharge pipe 3 which consists, for instance, of steel.

In the case of hard, i.e. lime-containing water, the magnetic unit 7 reduces lime deposits in the subsequent water conducting systems. In the case of soft, i.e. low-lime water, by virtue of the acid properties of the water, corrosive damage to the water conveying systems may occur. To prevent this, it is possible, as shown in FIG. 1, to connect to the outlet orifice 35 of the supporting plate 17 a throughflow container 54 which contains lime material 56 in pourable or bulk form. Since the magnetic unit 7 enhances the dissolution properties of the water in respect of lime material, the water flowing through the container 54 becomes increasingly enriched with lime. The lime enrichment reduces the acid properties of the water. The lime removed from the lime material 56 forms a corrosion-reducing protective coating on the walls of the subsequent water-conveying system.

As an alternative to the unit 9 or possibly also in addition to it, it is possible to dispose on the supporting plate and downstream of the magnetic unit 7 a further unit which exposes the water to an electrical field. An example of such a unit is shown at 53 in FIG. 3. The unit 3 in turn comprises a tubular/pot-shaped throughflow housing 55 the open end of which is screwed into the screwthreaded connection 21 on the base plate 19 downstream of the magnetic unit, which is not shown in FIG. 3. Connected to the throughflow aperture 31 in the base plate 19 and open at both ends is an electrode tube 57 which extends coaxially into the throughflow housing 55 forming between itself and the throughflow housing 55 an annularly cylindrical throughflow space 59 which is connected to the aperture 29. Inside the electrode tube 57 on insulating mountings 63 provided with throughflow apertures 61 an electrode rod 65 is supported coaxially with the electrode tube 57. The electrode rod 65 likewise forms an annularly cylindrical throughflow space 67.

Figure 3:
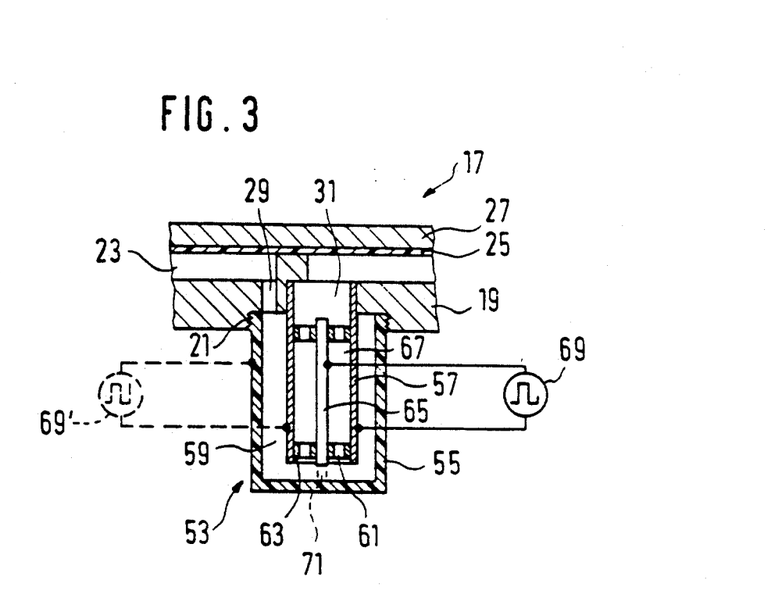
FIG. 3 shows an alternative form of unit for exposing the water to an electrical field and suitable for use in an apparatus according to FIGS. 1 and 2.

Connected to the electrodes 57, 65 is a low voltage source, in this case an alternating current pulse voltage source 69 which generates a pulse voltage of a few volts, for example, between 5 and 50 volts, with a pulse frequency of more than 1 KHz, for example between 10 and 20 KHz. The water flowing through the throughflow space 67 is in this way exposed to an electrical alternating current field. The electrical alternating current field reduces not only the risk of lime accumulation in the subsequent water-conveying systems, but also improves the biological properties of the water. Surprisingly, it has been found that the magnetic arrangement preceding the unit 53 reduces the conductivity of the water so that the pulse generator 69 only has to have a comparatively low output. Since the pulse generator 69 generates an alternating current field, also undesired electrolysis is reduced.

In the case of the aforementioned construction of the unit 53, the electrodes 57, 65 consist of metal while the throughflow housing 55 ideally consists of an insulating synthetic plastics material. Alternatively, as indicated in FIG. 3 by the pulse generator 69' the pulse generator may also be connected to the electrode tube 57 and the throughflow housing 55, which in this case consists of metal. The water is then exposed to the electrical field while in the throughflow space 59. In this alternative embodiment, the electrode rod 65 and the insulating holders 63 needed for it can be omitted. In a preferred development of this alternative embodiment, however, the electrode rod 65 can be retained and connected in electrically conductive fashion to the throughflow housing 55, and indicated at 71. In this development, the water is exposed to the electrical field both in the throughflow space 59 and the throughflow space 67. In this way a comparatively long treatment path can be achieved with a comparatively compact arrangement.

Figure 4:
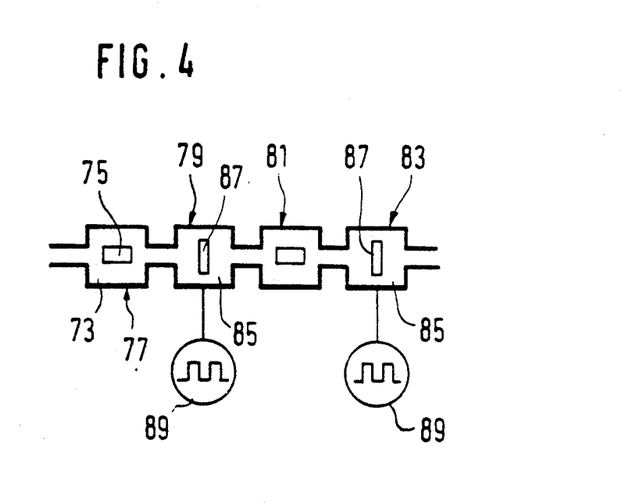
FIG. 4 shows an alternative arrangement of the apparatus in FIGS. 1 and 2.

FIG. 4 shows a development of the apparatus which can also be realised with structures other than those explained hereinabove. The apparatus comprises, in the throughflow path of the water, a sequence comprising firstly a magnetic unit 77 which exposes the water in a throughflow space 73 to the magnetic field of a magnet 75, and downstream of which there is a first unit 79 which exposes the water to an electrical field. Downstream of the unit 79 there follows a further magnetic unit 81 which exposes the water to a magnetic field and which is followed, further downstream, by a second unit 83 which exposes the water to an electrical field. The magnetic unit 81 may be constructed in the same way as the magnetic unit 77 and may, if necessary, be omitted. The units 79, 83 are preferably also of identical construction and contain in their throughflow space 85, indicated diagrammatically at 87, electrodes to which alternating current pulse generators 89 are in each case connected. The pulse generators 89 of the units 79, 83 have different pulse frequencies of greater than 1 KHz, for example, pulse frequencies which differ by a factor of the order of 2. For example, whereas the pulse generator of the unit 79 has a frequency of 10 to 20 KHz, the pulse generator of the unit 83 has a frequency of 20 to 40 KHz. The output voltage of the generators 89 is, in turn, of the order of a few volts. Downstream of the magnetic unit 77, there may be further units for exposing the water to an electrical field and their pulse generators may, in turn, have different pulse frequencies.

Figure 5:
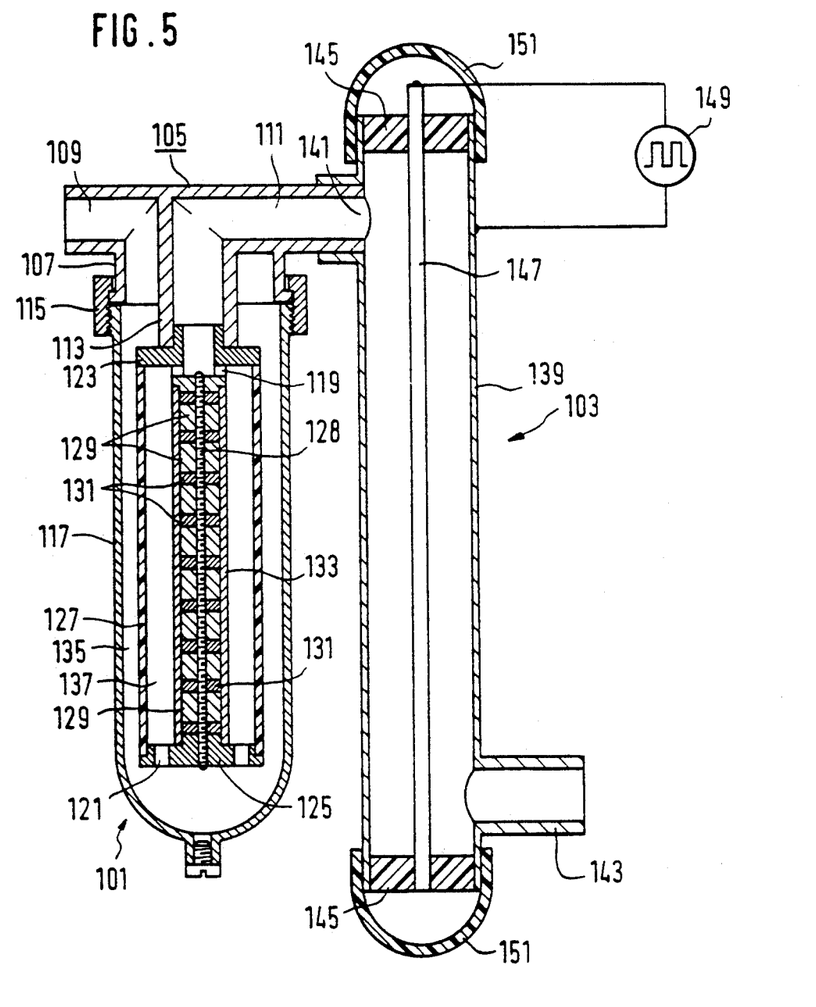
FIG. 5 shows a diagrammatic sectional view through an alternative water treatment apparatus.

FIG. 5 shows an apparatus which is likewise suitable for the treatment of water both by magnetic and also by electrical fields for reducing the risk of furring in subsequent water-conveying systems and for biological improvement of the water. The apparatus comprises, for subjecting the water to a magnetic field, a magnetic unit 101 which is connected to form one structural unit with a unit 103 exposing the water to an electrical field and disposed downstream of it in the flow path of the water. The magnetic unit 101 has a head 105 with a pipe extension piece 107 into which an inlet passage 109 discharges eccentrically. An outlet passage 111 from the head 105 discharges into a pipe union 113 coaxial with the pipe extension piece 107. The open end of a tubular housing 117 is connected to the pipe extension piece 107 by means of a cap nut 115. The pipe union 113 carries clamped between two end parts 123, 125 provided with apertures 119 and 121 a labyrinthine tube 127 which consists of a non-magnetic material, for example synthetic plastics material. A plurality of permanent magnets 129 are disposed in a series coaxially with the housing 117, and the labyrinthine tube 127, clamped by a screwthreaded rod 128 between the two end parts 123, 125, pole plates 131 of ferromagnetic material being disposed between the said permanent magnets 129. The permanent magnets 129 are applied with respectively the same polarity to the interposed pole plate 131 so that along the row of magnets a magnetic field of alternating polarity is created. The magnetic arrangement is enclosed by a protective tube 133, for example of stainless steel, and is sealed in respect of the end parts 123, 125. The water flowing in through the inlet passage 109 is exposed to the (in the direction of flow) alternating magnetic field of the magnets 129 both in an annular space 135 between the housing 117 and the labyrinthine tube 127 as well as in a second annular space 137 between the labyrinthine tube 127 and the protective tube 133, before it leaves the magnetic unit 101 through the outlet passage 111.

The unit 103 has a tubular housing 139 which consists of metal and which in the region of one of its ends is connected via a radial aperture 141 to the outlet passage 111 of the magnetic unit 101. In the region of the axially opposite end, the tubular housing 139 is provided with an outlet connection 143. Supported by insulating plates 145, an electrode rod 147 extends coaxially within the tubular housing 139. Connected to the electrode rod 147 and the tubular housing 139 is an alternating current pulse generator 149 which exposes to an electrical alternating current field the water flowing in the annular space between the electrode rod 147 and the tubular housing 139. The generator 149 periodically generates low voltage pulses of a few volts at a pulse sequence frequency greater than 1 KHz, and particularly of between about 10 and 20 KHz. Synthetic plastics caps 151 which may possible constructed in one piece with the insulating discs 145 outwardly mask the ends of the tubular housing 149 in a sealing-tight manner.

The construction of magnetic unit 101 can also be used in the apparatus shown in FIGS. 1 and 2, in which case then the tubular housing 117 is screwed into the screwthreaded connection 21 on the base plate 19, while the end part 123 is connected to the outlet aperture 31.

Figure 6:
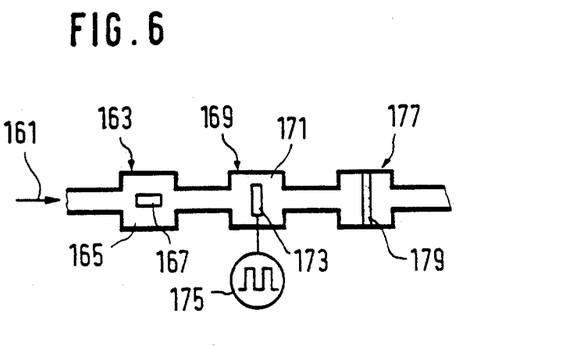
FIG. 6 shows a diagrammatic sectional view through a further alternative water treatment apparatus.

FIG. 6 diagrammatically shows an alternative form of apparatus which is likewise suitable for the treatment of water. The apparatus comprises in the direction of flow 161 of the water and serially arranged a magnetic unit 163 with a magnet 167 disposed in a throughflow chamber 165 and, downstream of the magnetic unit 163, a unit 169 which in a throughflow chamber 171 exposes the water to an electrical field generated by an electrode arrangement 173. The electrode arrangement 173 is connected to a pulse generator 175 similar to the pulse generators already described hereinabove. Downstream of the serial arrangement of units 163, 169 there is a particle filter 177 of which the filter element 179 at least partially filters off the proportion of lime in the water, the structure of which is altered by the units 163, 169. The filter 177 makes it possible to adjust the lime content of the water to desired levels. The particle filter 177 can also be provided in the apparatus described with reference to FIGS. 1 to 5.

Figure 7:
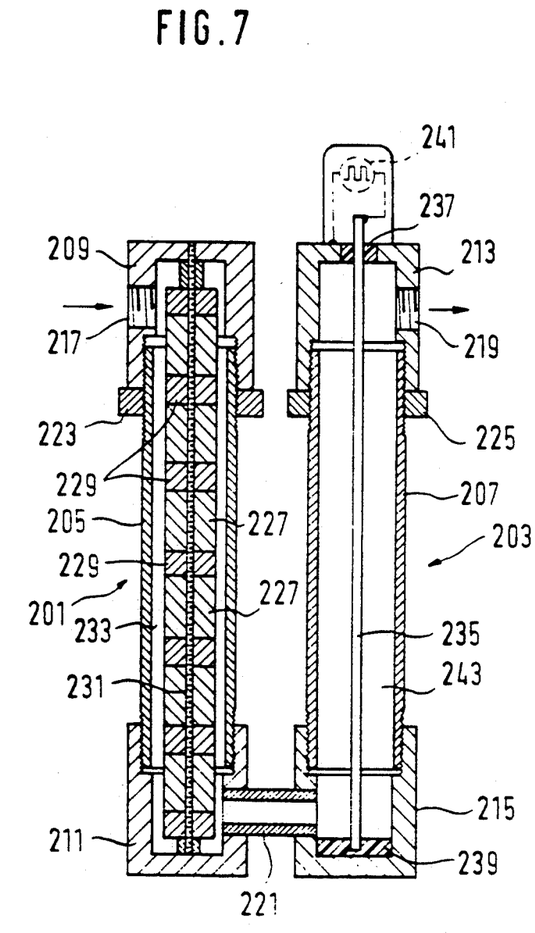
FIG. 7 is a diagrammatic sectional view of an alternative to the apparatus shown in FIG. 5.

FIG. 7 shows an alternative form of the apparatus in FIG. 5. The apparatus comprises, for exposing the water to a magnetic field, a magnetic unit 201 which is combined into one unit with a unit 203 downstream of ti in the direction of flow of the water, and which exposes the water to an electrical field. Both units 201, 203 comprise tubular housing 205, 207 onto the ends of which are screwed housing caps 209, 211 and 213, 215. The tubular housings 205, 207 are disposed one beside the other in axially parallel fashion, the mutually adjacent caps 209, 213 containing an inlet aperture 217 and an outlet orifice 219, the caps 211, 215 being combined into one structural unit by means of a tube portion 221 which connects an outlet orifice in the cap 211 to an inlet aperture in the cap 215. Whereas the tubular housings 205, 207 are screwed rigidly into the caps 211, 215, the caps 209, 213 are rotatable in relation to the tubular housings 205, 207 and can be secured by a lock nut 223, 225. The inlet aperture and outlet orifice 217, 219 can in this way be rotated in respect of each other according to the particular installation circumstances.

Like the apparatus shown in FIG. 5, the magnetic unit 201 contains a plurality of permanent magnets 227 which are clamped in the axial direction of the tubular housing 205 one beside another with alternating polarity between, in each case two pole plates 229 on a screwthreaded rod 231. The permanent magnets 227 and pole plates 229 define between themselves and the tubular housing 205 a throughflow space 233 in which the water fed to the inlet aperture 217 is exposed to a magnetic field of alternating polarity.

In the metal tubular housing 207 of the unit 203 there is a coaxially disposed electrode rod 235 which in the region of caps 213, 215 is supported in insulating holders 237, 239. For the rest the caps 213, 215 are likewise of metal. Connected to the electrode rod 239 and the tubular housing 207 or the caps 213 connected thereto, there is an alternating current pulse generator 241 which exposes to an electrical alternating current field the water flowing in the annular space 243 between the electrode rod 235 and the tubular housing 207. The generator 241 otherwise corresponds to the generator 149.

I claim:

1. An apparatus for treating liquids which are moving along a flow path, comprising:
   a plurality of treatment means successively arranged in the direction of the flow path, the plurality of treatment means further comprising:
   first means arranged in the flow path of the liquid for exposing the liquid to a magnetic field while in the flow path;
   second means for exposing the liquid to an electrical field, the second means including a tubular metal housing having opposed ends, each said end including means defining an aperture leading from an interior of said housing to an exterior of said housing;
   a substantially rod-shaped electrode arranged coaxially in the tubular housing and supported on insulating spacers;
   voltage source means connected between the tubular housing and the electrode;
   a tubular housing of said first means, said housing having opposed ends, each said end including means defining an aperture leading from an interior of said housing to an exterior of said housing;
   a plurality of permanent magnets disposed in a row in the axial direction of the tubular housing of said first means and disposed next to one another and having alternating polarity;
   a throughflow space formed between the permanent magnets or between the permanent magnets and the tubular housing; and
   a tube, wherein the tubular housings of the first means and second means are disposed axially parallel with and beside one another one of said apertures of said first means being connected to one of said apertures of said second means by said tube so that the tubular housings are combined into a single structural unit.

2. The apparatus of claim 1, wherein each said means defining an aperture is comprised of a cap screwed onto each of said ends of said housings, and wherein each said aperture is provided in a respective said cap.

3. The apparatus of claim 2, wherein said aperture of said first means and said aperture of said second means are connected to one another and are provided in said caps which are rigidly connected by said tube into a single structural unit into which the tubular housings are screwed.

4. The apparatus of claim 1, wherein said voltage source means comprises an electrical pulse generator connected between said tubular metal housing and said electrode to generate periodic voltage pulses.

5. The apparatus of claim 4, wherein the pulse generator generates periodic voltage pulses with a pulse sequence frequency that is greater than 1 KHz.

6. An apparatus for treating liquids which are moving along a flow path, comprising:
   a plurality of treatment means successively arranged in the direction of the flow path, comprising:
   first means for exposing the liquid to a magnetic field while in the flow path; and
   second means for exposing the liquid to an electrical field, the second means including a tubular metal housing having an inlet aperture at one end and a discharge orifice at its other end;
   a substantially rod-shaped electrode coaxially arranged in the tubular housing and supported on insulating spacers;
   voltage source means connected between the tubular housing and the electrode;
   a tubular housing of said first means, said housing having an inlet aperture at one end and is closed at its other end and having an axis;
   a tube arranged to project substantially along said axis equi-axially into the tubular housing to form together with the housing a first annular throughflow space, wherein the tube, adjacent the inlet aperture, forms a discharge orifice open axially opposite the closed end of the tubular housing; and
   a plurality of permanent magnets disposed in a row of alternating polarity within and along an axial direction of the tube forming a second annular throughflow space between the magnets and the tube.

7. The apparatus of claim 6, wherein the permanent magnets are disposed in a protective tube extending substantially along the same axis as the tube, and wherein the second annular throughflow space is situated between the protective tube and the tube.

8. An apparatus for treating liquids which are moving along a flow path, comprising:
   a plurality of treatment means successively arranged in the direction of the flow path, comprising:
   first means for exposing the liquid to a magnetic field while in the flow path;

second means for exposing the liquid to an electrical field, the second means including a tubular metal housing having an inlet aperture at one end and a discharge orifice at its other end;

a substantially rod-shaped electrode coaxially arranged in the tubular housing and supported on insulating spacers;

voltage source means connected between the tubular housing and the electrode;

a tubular housing of said first means, said housing having an inlet aperture at one end and is closed at its other end and having an axis;

a tube arranged to project substantially along said axis into the tubular housing of said first means to form together wit the housing a first annular throughflow space, wherein the tube adjacent the inlet aperture forms a discharge orifice open axially opposite the closed end of the tubular housing;

a plurality of permanent magnets disposed in a row of alternating polarity within and along an axial direction of the tube forming a second annular throughflow space between the magnets and the tube; and said voltage source means comprising an electrical pulse generator connected between said tubular metal housing and said electrode to generate periodic voltage pulses.

9. An apparatus for treating liquids which are moving along a flow path, comprising:

a plurality of treatment means successively arranged in the direction of the flow path, comprising:

first means for exposing the liquid to a magnetic field while in the flow path;

second means for exposing the liquid to an electrical field, the second means including a tubular metal housing having an inlet aperture at one end and a discharge orifice at its other end;

a substantially rod-shaped electrode coaxially arranged in the tubular housing and supported on insulating spacers;

voltage source means connected between the tubular housing and the electrode;

a tubular housing of said first means, said housing having an inlet aperture at one end and is closed at its other end and having an axis;

a tube arranged to project substantially along said axis into the tubular housing of said first means to form together with the housing a first annular throughflow space, wherein the tube adjacent the inlet aperture forms a discharge orifice open axially opposite the closed end of the tubular housing;

a plurality of permanent magnets disposed in a row of alternating polarity within and along an axial direction of the tube forming a second annular throughflow space between the magnets and the tube;

said voltage source means comprising an electrical pulse generator connected between said tubular metal housing and said electrode to generate periodic voltage pulses; and the pulse generator generates periodic voltage pulses with a pulse sequence frequency that is greater than 1 KHz.

10. An apparatus for treating liquids which are moving along a flow path, comprising:

means defining a flow path;

a plurality of first means arranged in the flow path of the liquid for exposing the liquid to a magnetic field; and a plurality of second means for exposing the liquid to an electrical field, each said second means including an electric pulse generator connected to an electrode arrangement to generate periodic voltage pulses having a pulse sequence frequency that is greater than 1 KHz, and wherein each said pulse generator of a respective said second means produces a pulse frequency that is different from that of the pulse generators of the other said second means, and wherein one of said first means is disposed in the flow path between two of said second means.

* * * * *